United States Patent
Kim et al.

(10) Patent No.: US 12,441,279 B2
(45) Date of Patent: Oct. 14, 2025

(54) ELECTRONIC BRAKE PEDAL APPARATUS

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Chae Min Lim, Daegu (KR); Ji Soo Kim, Daegu (KR); Jae Kyung Pee, Daegu (KR)

(73) Assignees: Hyundai Motor Company, Seoul (KR); Kia Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 234 days.

(21) Appl. No.: 18/218,995

(22) Filed: Jul. 6, 2023

(65) Prior Publication Data
US 2024/0217491 A1  Jul. 4, 2024

(30) Foreign Application Priority Data
Jan. 4, 2023  (KR) .................. 10-2023-0001404

(51) Int. Cl.
*B60T 7/04* (2006.01)

(52) U.S. Cl.
CPC ........... *B60T 7/042* (2013.01); *B60T 2220/04* (2013.01)

(58) Field of Classification Search
CPC ........ B60T 7/042; B60T 7/06; B60T 2220/04; G05G 1/30–506
See application file for complete search history.

(56) References Cited

U.S. PATENT DOCUMENTS

| | | | |
|---|---|---|---|
| 6,408,712 B1 | 6/2002 | Bolisetty et al. | |
| 6,591,710 B1 * | 7/2003 | Shaw | G05G 1/30 74/513 |
| 6,612,659 B2 * | 9/2003 | Fulks | B60T 13/662 91/369.1 |
| 7,404,342 B2 * | 7/2008 | Wurn | G05G 5/03 74/512 |
| 7,916,489 B2 * | 3/2011 | Okuya | B60T 7/042 361/752 |
| 8,773,116 B2 * | 7/2014 | Hirose | G01D 5/145 324/207.2 |
| 10,877,507 B2 * | 12/2020 | Lee | B60T 7/06 |
| 10,906,514 B1 * | 2/2021 | Kim | G05G 1/40 |
| 2004/0187625 A1 * | 9/2004 | Schiel | B60T 7/042 74/514 |

(Continued)

FOREIGN PATENT DOCUMENTS

EP 3376333 A1 9/2018
JP 2018-147483 9/2018

(Continued)

*Primary Examiner* — Thomas C Diaz
(74) *Attorney, Agent, or Firm* — MORGAN, LEWIS & BOCKIUS LLP

(57) ABSTRACT

An electronic brake pedal apparatus may perform a function of a stop lamp switch and a function of a stroke sensor in the related art by use of electronic Hall sensors and a Hall switch and diagnose failure by use of the two Hall sensors and the Hall switch, which makes it possible to simplify a configuration, reduce an external size and costs, and improve durability, reliability, and marketability by use of a contactless sensor.

18 Claims, 11 Drawing Sheets

(56) References Cited

U.S. PATENT DOCUMENTS

2019/0232928 A1     8/2019   Adachi et al.

FOREIGN PATENT DOCUMENTS

| KR | 20-0377639 Y1 | 3/2005 |
| KR | 10-2014-0063130 | 5/2014 |
| KR | 10-2015-0070655 | 6/2015 |
| KR | 10-2016-0052728 | 5/2016 |
| KR | 10-2018-0138318 | 12/2018 |
| KR | 10-2019-0016268 | 2/2019 |
| KR | 10-2019-0109733 | 9/2019 |

* cited by examiner

ELECTRONIC BRAKE PEDAL APPARATUS

CROSS REFERENCE TO RELATED APPLICATION

The present application claims priority to Korean Patent Application No. 10-2023-0001404, filed Jan. 4, 2023, the entire contents of which is incorporated herein for all purposes by this reference.

BACKGROUND OF THE PRESENT DISCLOSURE

Field of the Present Disclosure

The present disclosure relates to an electronic brake pedal apparatus, and more particularly, to a technology associated with an electronic brake pedal apparatus capable of performing a stop lamp switch and a function of a stroke sensor by use of an electronic Hall sensor and a Hall switch.

Description of Related Art

An electronic brake pedal apparatus may be used for an environment-friendly vehicle and a smart vehicle which may autonomously travel, and the electronic brake pedal apparatus does not include a mechanical connection structure such as a cable between a brake pedal and a braking system.

The electronic brake pedal apparatus includes: a stop lamp switch configured to transmit a signal to a stop lamp (brake lamp) when the brake pedal operates; and a stroke sensor configured to detect an operation amount (manipulation displacement) of the brake pedal and generate a signal related to braking.

The electronic brake pedal apparatus may be configured to generate a main braking signal and a redundancy braking signal to ensure stability. To the present end, the electronic brake pedal apparatus has two stroke sensors.

The stop lamp switch and the stroke sensors each include a casing having a predetermined size, and a plurality of sensor components provided in the casing. In particular, in case that the two stroke sensors are provided, there is a problem of increases in size, weight, and costs of the electronic brake pedal apparatus in the related art.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic brake pedal apparatus configured for performing a stop lamp switch and a function of a stroke sensor in the related art by use of an electronic Hall sensor and a Hall switch, which makes it possible to simplify a configuration, reduce a weight and costs, decrease an external size, and improve durability by use of a contactless sensor.

Various aspects of the present disclosure are directed to providing an electronic brake pedal apparatus including: a pedal arm rotatably coupled to a pedal housing; a plurality of magnet portions connected to the pedal arm and configured to change magnetic flux when the pedal arm rotates; a plurality of sensor portions configured to detect a change in the magnetic flux of the magnet portions; and a pedal controller fixed to the pedal housing to face the magnet portions and connected to a plurality of sensor portions, the pedal controller being configured to transmit a control signal to a vehicle controller and a braking controller by use of signals of the sensor portions.

The vehicle controller is configured to control a signal related to a function of a stop lamp switch and include at least one of a controller of turning on a vehicle, a controller of controlling an operation of turning on or off a stop lamp, and a controller of controlling a shift lock.

The braking controller is configured to control a signal related to a braking function of a vehicle that corresponds to a function of a stroke sensor, and the braking controller may include: a main braking controller configured to control braking of the vehicle; and an auxiliary braking controller configured to perform a redundancy function of the main braking controller.

The electronic brake pedal apparatus may further include: a detecting module disposed between the pedal arm and the pedal controller so that the magnet portion is positioned on the detecting module, in which the detecting module includes: a rotation lever connected to one side of the pedal arm and configured to rotate together with the pedal arm; and a lever casing fixed to the pedal housing and configured to cover the rotation lever.

The magnet portions may include: a first magnet coupled to one side of the pedal arm and spaced from a hinge pin coupled to the pedal arm at a predetermined distance, the first magnet being configured to move along an arc trajectory based on the hinge pin when the pedal arm rotates; and a second magnet spaced from the hinge pin at a distance longer than a distance between the hinge pin and the first magnet, the second magnet being coupled to be rotatable in place at a position on the lever casing.

The first magnet and the second magnet may be provided to face the sensor portion of the pedal controller while being externally exposed of the detecting module.

A pinion gear may be rotatably coupled to the lever casing, a gear portion may be formed at an end portion of the rotation lever and engage with the pinion gear, the second magnet may be coupled to a center portion of the pinion gear, and the second magnet may be rotated in place by a rotation of the pinion gear when the rotation lever rotates.

The sensor portion may include a Hall switch provided on the pedal controller to face the first magnet, and the pedal controller may be configured to transmit a signal, which is related to a function of a stop lamp switch, to the vehicle controller by use of a signal of the Hall switch.

The sensor portion may include a first Hall sensor and a second Hall sensor provided on the pedal controller to face the first magnet and the second magnet, and the pedal controller may be configured to transmit a signal, which is related to a braking function of a vehicle that corresponds to a function of a stroke sensor, to a braking controller by use of a signal of the first Hall sensor and a signal of the second Hall sensor.

The first Hall sensor and the Hall switch may be disposed on a line extending straight from a center portion of the hinge pin.

The Hall switch may be provided as two Hall switches, the two Hall switches may be disposed at first and second opposite sides of the first Hall sensor, one Hall switch for each opposite side, in a state in which the first Hall sensor is provided at a center portion between the two Hall switches, and the two Hall switches may be spaced from the first Hall sensor at a same distance.

The pedal controller may be configured to determine a signal of the first Hall sensor, which is relatively higher in accuracy between the signal of the first Hall sensor and the signal of the second Hall sensor, as a main signal and transmit the main signal to a main braking controller that forms the braking controller, and the pedal controller may be configured to determine the signal of the second Hall sensor as a redundancy signal and transmit the redundancy signal to an auxiliary braking controller that forms the braking controller.

The second Hall sensor may be positioned to be spaced from a surface of the pedal housing at a distance longer than a distance between the first Hall sensor and the surface of the pedal housing.

The Hall switch may be connected to a battery power source of the vehicle and transmit a signal to the vehicle controller and the braking controller, and the first Hall sensor and the second Hall sensor may be connected to an ignition power source of the vehicle or connected to a power source of the braking controller and transmit signals to the braking controller.

In a state in which the vehicle is turned off, only the Hall switch may be kept in an activated state, and the pedal controller and the braking controller may be kept in a deactivated state.

When the pedal arm is rotated in response to operation of a driver in a state in which the vehicle is turned off, a signal of the Hall switch may be transmitted to the vehicle controller, a stop lamp may be turned on, the braking controller and the pedal controller may be activated by the signal of the Hall switch, power may be supplied to the first Hall sensor and the second Hall sensor, the first Hall sensor and the second Hall sensor may detect a rotation of the pedal arm based on a change in magnetic flux, the pedal controller may be configured to transmit a signal, which is proportional to the rotation of the pedal arm, to the braking controller, and the braking controller may be configured to generate a signal related to the braking function of the vehicle.

The braking controller and the pedal controller may enter a deactivation mode when the pedal arm does not rotate for a predetermined time period in a state in which the braking controller and the pedal controller are activated.

A connection portion may be provided at one side of the pedal arm and connect the pedal arm and the rotation lever, a seating portion, to which the first magnet is coupled, may be provided at one side of the pedal arm, the connection portion and the seating portion may move along arc trajectories along a rotation radius based on the hinge pin when the pedal arm rotates, first and second holes each including an arc curvature may be formed in the lever casing to allow the connection portion and the seating portion to move, and the second magnet may be positioned to be spaced from the second hole in a direction opposite to the second hole with the first hole interposed therebetween.

The electronic brake pedal apparatus may further include: a foldable mechanism provided in the pedal housing, connected to the pedal arm, and configured to enable a pop-up operation and a hiding operation of the pedal arm, in which the pedal controller is configured to control an operation of the foldable mechanism and to process a signal with an autonomous driving controller.

Various aspects of the present disclosure are directed to providing an electronic brake pedal apparatus including: a first magnet coupled to a pedal arm and configured to move along an arc trajectory when the pedal arm rotates; a second magnet provided on a detecting module connected to the pedal arm and configured to rotate in place at a position on the detecting module when the pedal arm rotates; and a pedal controller including a first Hall sensor and a Hall switch facing the first magnet and a second Hall sensor facing the second magnet, the pedal controller being fixed to a pedal housing, in which the pedal controller is configured to transmit a signal to a vehicle controller by use of a signal of the Hall switch and transmits a signal to a braking controller by use of a signal of the first Hall sensor and a signal of the second Hall sensor, in which the vehicle controller is configured to control a signal related to a function of a stop lamp switch, and in which the braking controller is configured to control a signal related to a braking function of a vehicle that corresponds to a function of a stroke sensor.

The electronic brake pedal apparatus according to an exemplary embodiment of the present disclosure is configured to perform the function of the stop lamp switch and the function of the stroke sensor in the related art by use of the electronic Hall sensors and the Hall switch. Therefore, it is possible to simplify the configuration, reduce the weight and costs, decrease the external size, and particularly improve the durability by use of the contactless configuration.

Furthermore, the electronic brake pedal apparatus according to an exemplary embodiment of the present disclosure may diagnose the failure by use of the two Hall sensors and the Hall switch. Therefore, it is possible to improve the reliability and marketability of the electronic brake pedal apparatus.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
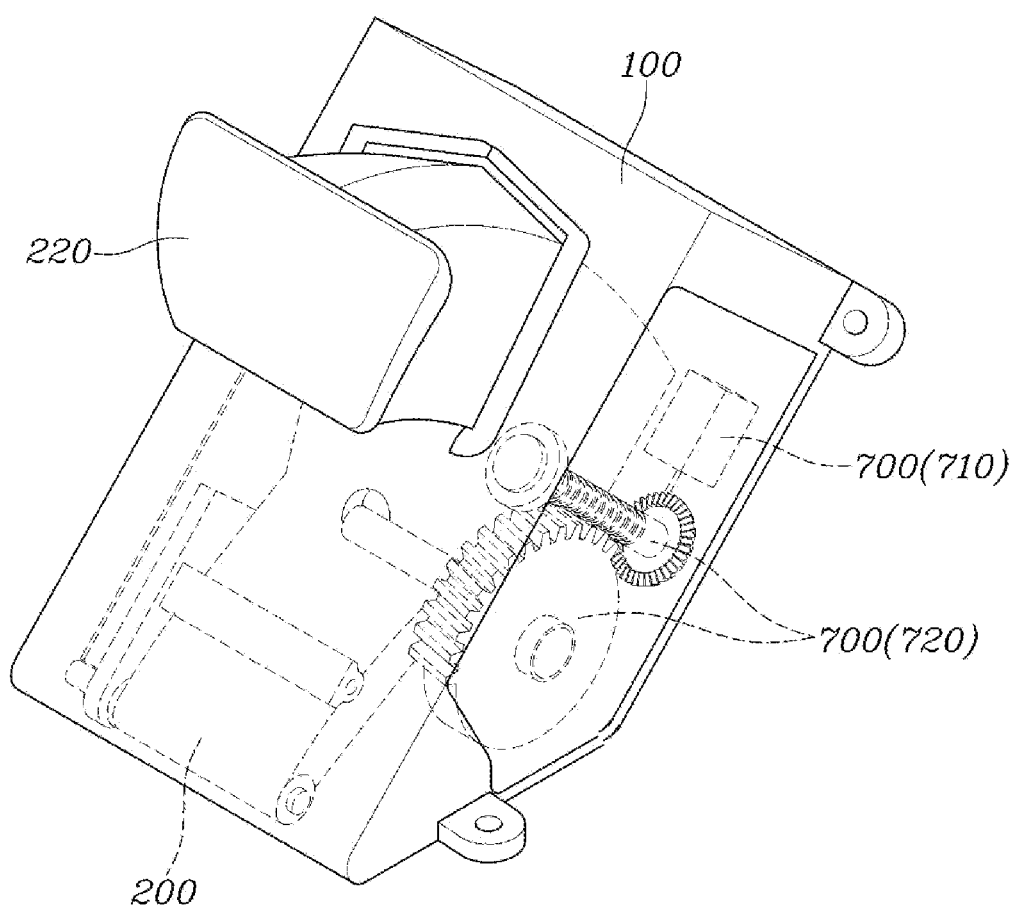
FIG. 1 is a perspective view of an electronic brake pedal apparatus according to an exemplary embodiment of the present disclosure.
Figure 2:
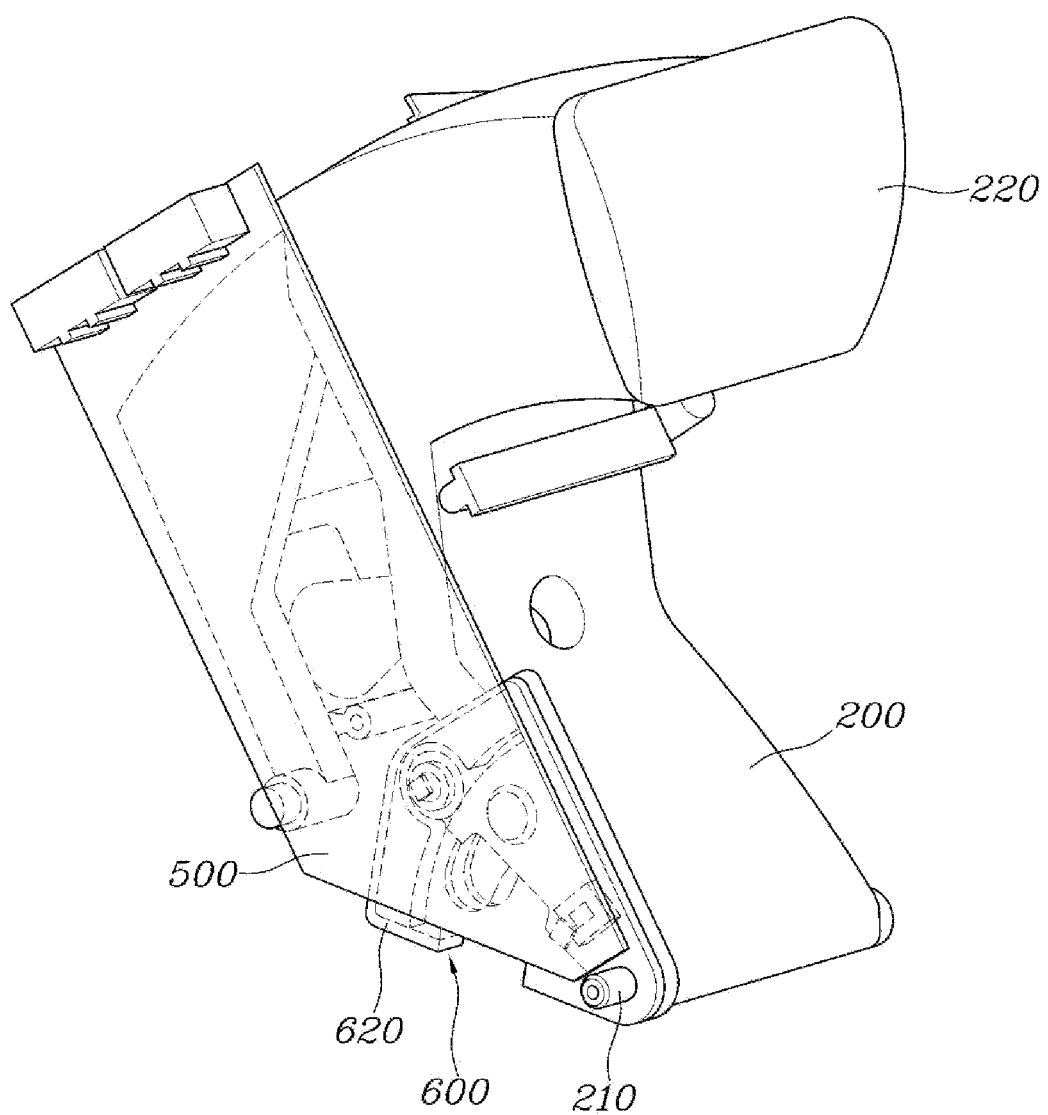
FIG. 2 is a view exemplarily illustrating a state in which a pedal housing in FIG. 1 is removed.
Figure 3:
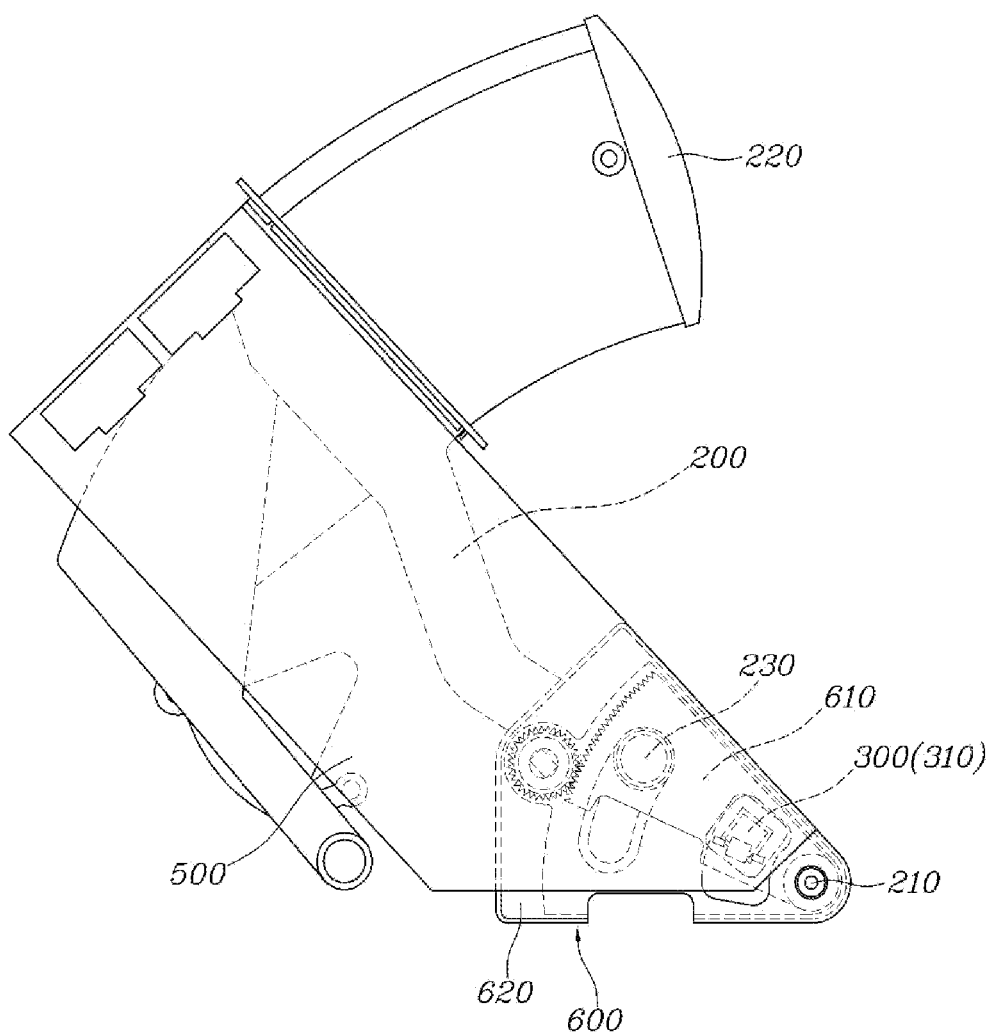
FIG. 3 and FIG. 4 are a side view and a front view of FIG. 2.
Figure 4:
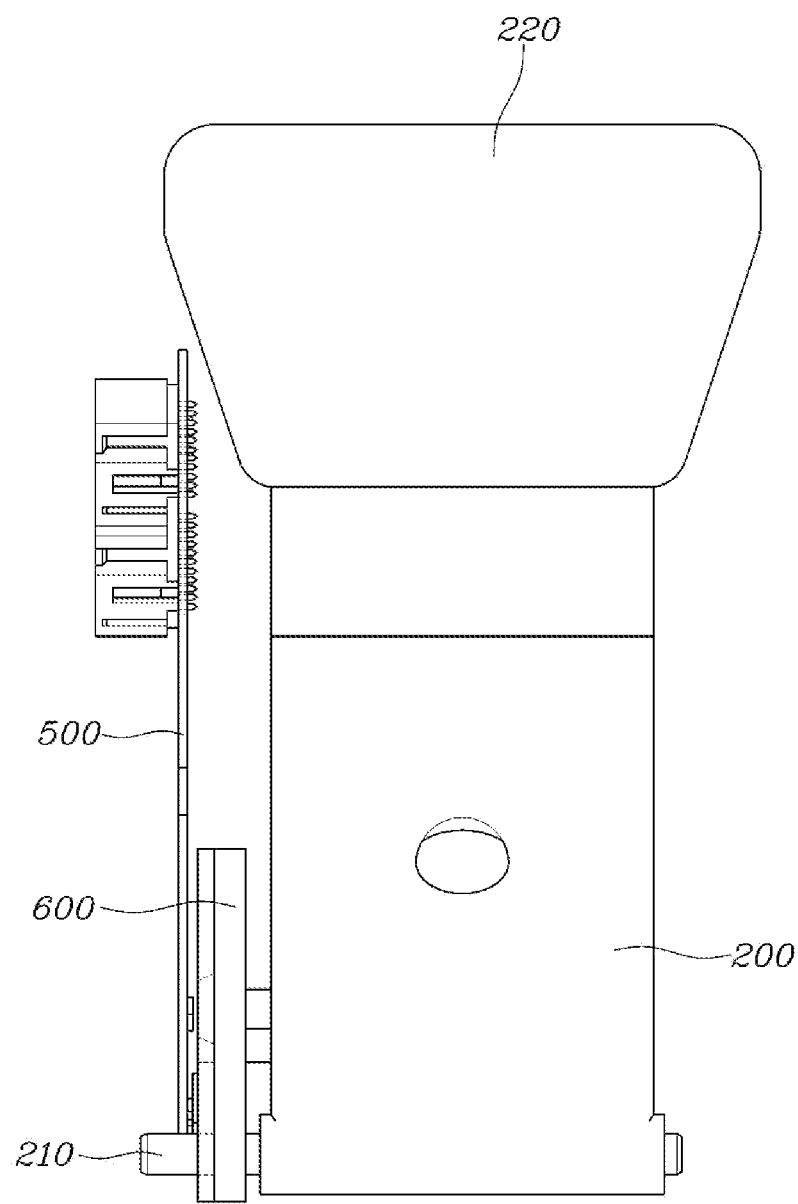
Figure 5:
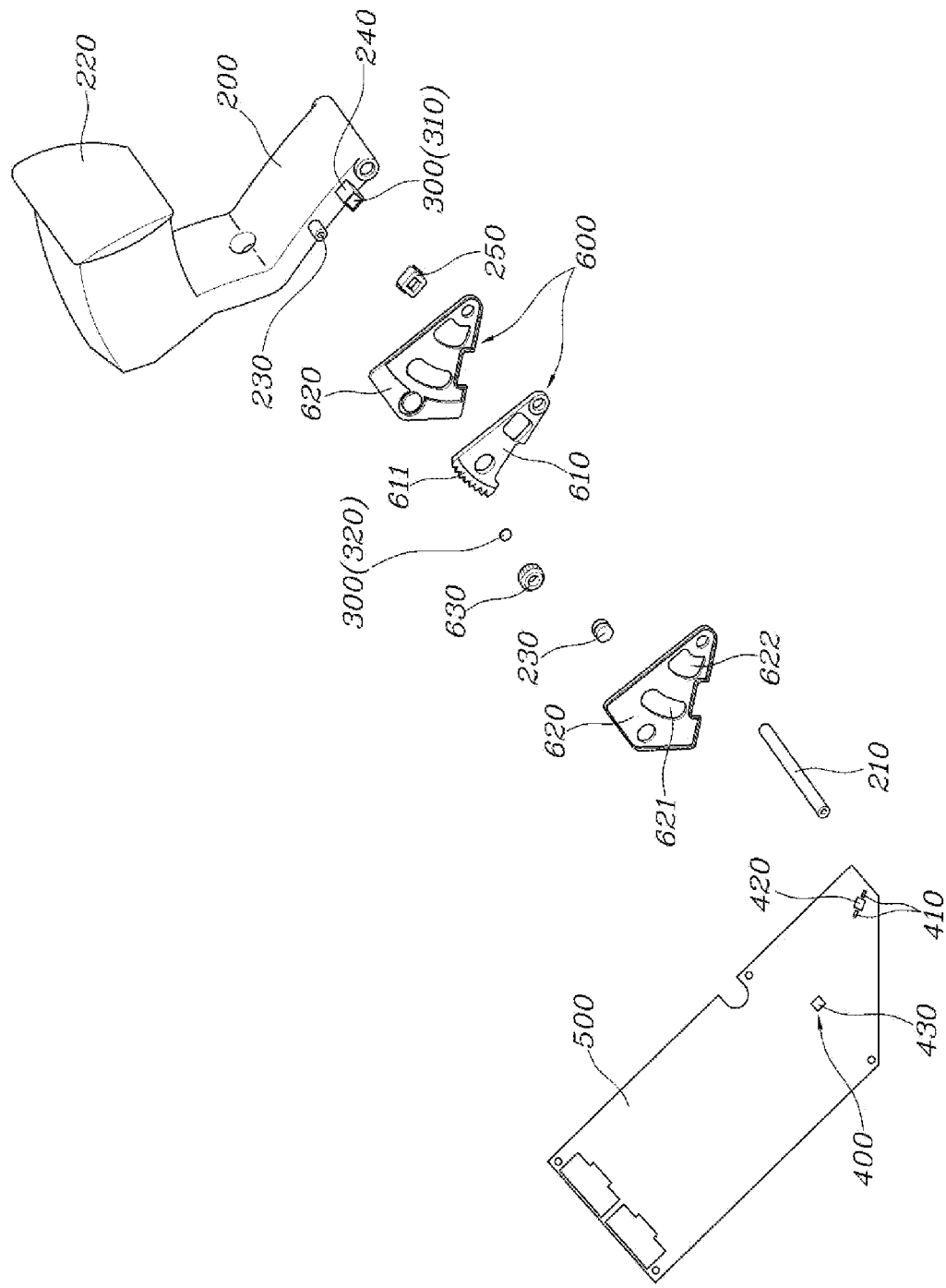
FIG. 5 is an exploded view of FIG. 3.
Figure 6:
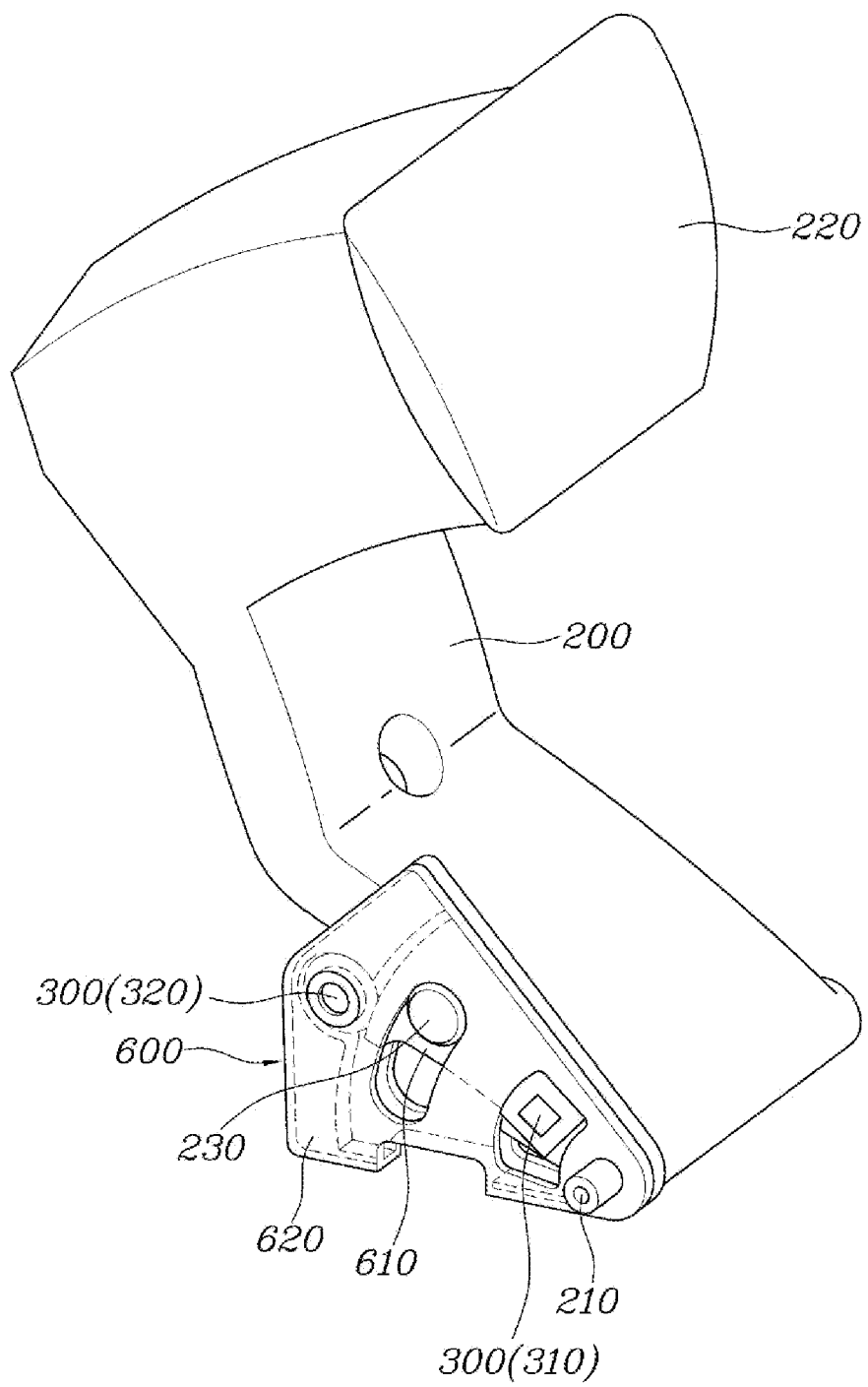
FIG. 6 is a view exemplarily illustrating a state in which a pedal controller in FIG. 3 is removed.
Figure 7:
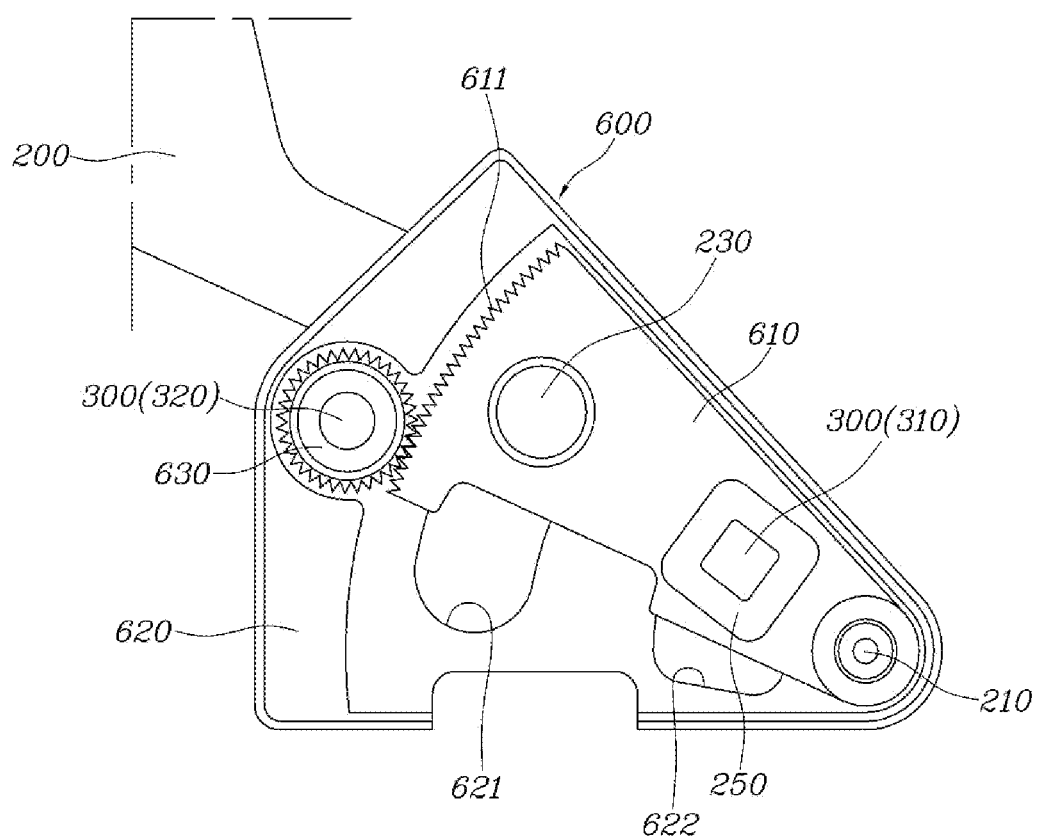
FIG. 7 and FIG. 8 are views for explaining a magnet portion and a detecting module according to an exemplary embodiment of the present disclosure and illustrating states made before and after a pedal arm operates.
Figure 8:
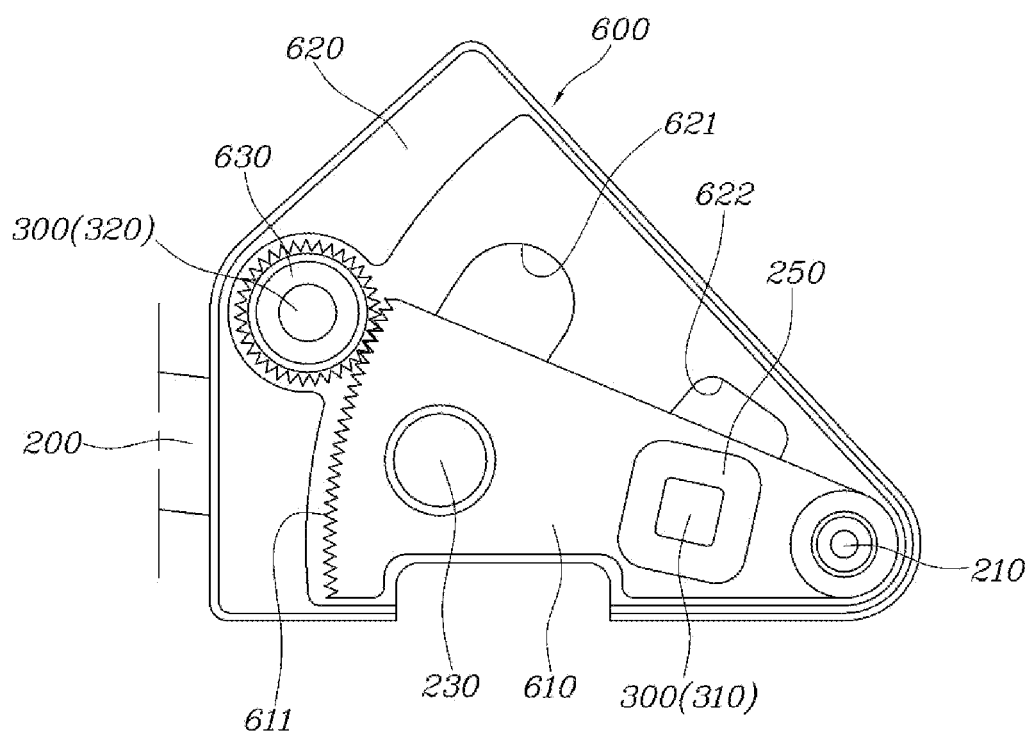
Figure 9:
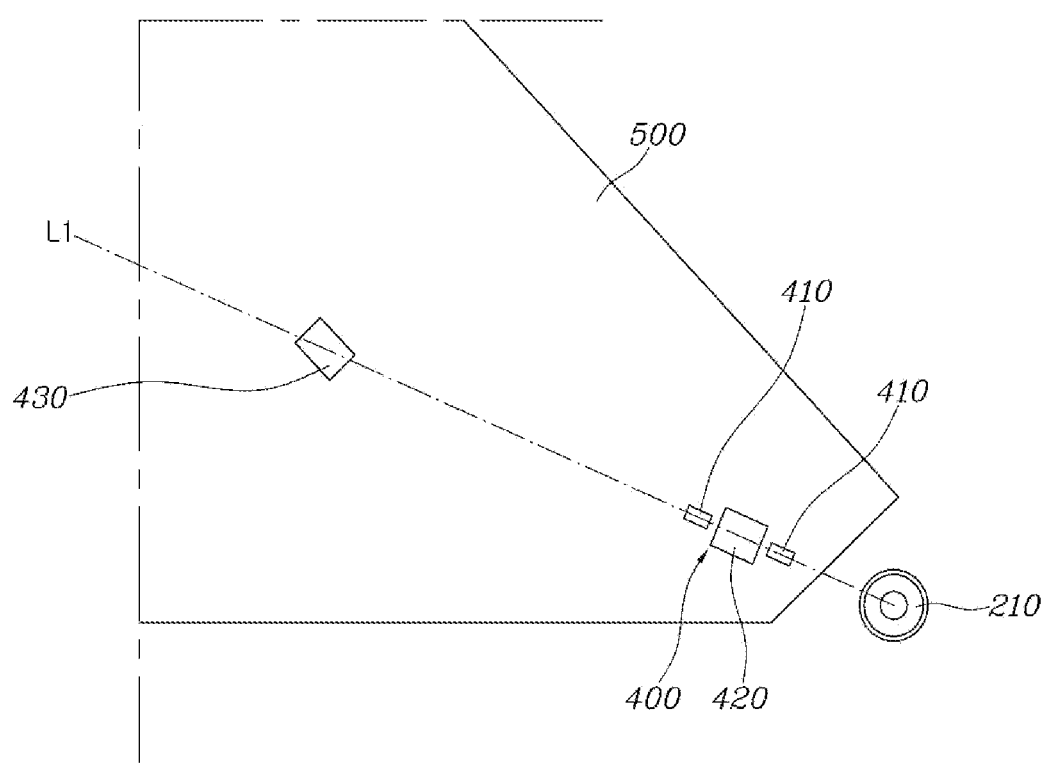
FIG. 9 and FIG. 10 are views for explaining a sensor portion according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the embodiments included in the present specification, the specific descriptions of publicly known related technologies will be omitted when it is determined that the specific descriptions may obscure the subject matter of the embodiments included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" included in the name of "motor control unit (MCU)" or "hybrid control unit (HCU)" is merely a term widely used to name a control device (controller or control unit) for controlling a vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an electronic brake pedal apparatus according to various exemplary embodiments of the present disclosure will be described with reference to the accompanying drawings.

As illustrated in FIGS. 1 to 11, an electronic brake pedal apparatus according to various exemplary embodiments of the present disclosure may include a pedal housing 100 fixed in a lower space of a driver seat; a pedal arm 200 coupled to the pedal housing 100 by a hinge pin 210 and configured to be rotatable forward or rearward thereof, the pedal arm 200 being configured to be operated by a driver and including a pedal pad 220; a plurality of magnet portions 300 connected to the pedal arm 200 and configured to change magnetic flux when the pedal arm 200 rotates; a plurality of sensor portions 400 configured to detect a change in magnetic flux of the magnet portion 300; and a pedal controller 500 fixed to the pedal housing 100 to face the magnet portions 300 and connected to a plurality of sensor portions 400, the pedal controller 500 being configured to transmit a control signal to a vehicle controller 10 and a braking controller 20 by use of a signal from the sensor portion 400.

The pedal apparatus according to an exemplary embodiment of the present disclosure is an organ type pedal apparatus in which a lower end portion of the pedal arm 200 rotatably coupled to the pedal housing 100 by the hinge pin 210, and the pedal pad 220 is provided at an upper end portion of the pedal arm 200.

In the electronic brake pedal apparatus according to an exemplary embodiment of the present disclosure, the plurality of magnet portions 300 and the plurality of sensor portions 400 generate signals in a contactless manner when the pedal arm 200 rotates. The signals generated by the sensor portions 400 include a signal related to a function of a stop lamp switch, and a signal related to a braking function of a vehicle that corresponds to a function of a stroke sensor.

Therefore, the single stop lamp switch and the two stroke sensors, which operate in a contact manner in an electronic brake pedal apparatus generally, may be configured as contactless sensors in the electronic brake pedal apparatus according to an exemplary embodiment of the present disclosure. Therefore, it is possible to simplify the configuration, reduce the weight and costs, decrease the external size, and improve the durability by use of the contactless configuration.

The vehicle controller 10 is configured to control a signal related to a function of the stop lamp switch and include at least one of a controller (an IBU controller 11) related to a function of turning on the vehicle, a controller (an ICU controller 12) related to a function of controlling an operation of turning on or off a stop lamp, and a controller (a VCU controller 13) related to a function of controlling a shift lock.

The IBU (integrated body control unit) controller 11 refers to a device configured to receive an operation amount of a brake pedal and generate a control signal to turn on the vehicle in a state in which the brake pedal is pushed. The IBU controller 11 is configured to control a signal related to the function of the stop lamp switch in the brake pedal apparatus.

The Integrated Central Control Unit (ICU) controller 12 refers to a device configured to receive the operation amount of the brake pedal and control the stop lamp. The ICU controller 12 is configured to control a signal related to the function of the stop lamp switch in the brake pedal apparatus.

The Vehicle Control Unit (VCU) controller 13 refers to a device configured to receive the operation amount of the brake pedal and control the shift lock. The VCU controller 13 is configured to control a signal related to the function of the stop lamp switch in the brake pedal apparatus.

The controllers (IBU, ICU, and VCU) may be provided as separate controllers or provided as sub-controllers in the single vehicle controller 10.

The braking controller 20 is configured to control a signal related to the braking function of the vehicle that corresponds to the function of the stroke sensor and include a main braking controller (IEB controller 21) configured to control braking of the vehicle, and an auxiliary braking controller (RCU controller 22) configured to perform a redundancy function of the main braking controller.

The IEB (integrated electronic brake) controller 21 refers to a device configured to receive the operation amount of the brake pedal and control braking of the vehicle. The IEB controller 21 is activated by a Hall switch signal, which will be described below, when the pedal arm 200 is operated in a state in which the vehicle is turned off. The IEB controller 21 is configured to control a signal related to braking of the vehicle that corresponds to the function of the stroke sensor in the brake pedal apparatus.

The RCU (redundancy control unit) controller 22 refers to a device which is one of autonomous driving redundancy braking components and is configured to receive the operation amount of the brake pedal and control braking of the vehicle. The RCU controller 22 is configured to perform the redundancy function of the IEB controller 21 and is activated by the Hall switch signal, which will be described below, when the pedal arm 200 is operated in the state in which the vehicle is turned off. The RCU controller 22 is configured to control a signal related to braking of the vehicle that corresponds to the function of the stroke sensor in the brake pedal apparatus.

In the exemplary embodiment of the present disclosure, the electronic brake pedal apparatus includes a detecting module 600 disposed between the pedal arm 200 and the pedal controller 500, and the magnet portions 300 are positioned on the detecting module 600. The detecting module 600 is provided to be connected to the pedal arm 200.

That is, the detecting module 600 includes: a rotation lever 610 connected to one side of the pedal arm 200 and configured to rotate together with the pedal arm 200; and lever casings 620 fixed to the pedal housing 100 and configured to cover the rotation lever 610.

The hinge pin 210, which is coupled to the lower end portion of the pedal arm 200, is provided to penetrate one end portion of the rotation lever 610 and the lever casings 620. A connection portion 230 protrudes toward one side from one side of the pedal arm 200.

The connection portion 230 is provided to penetrate the lever casings 620 and is integrally coupled to the rotation lever 610.

Therefore, when the pedal arm 200 rotates about the hinge pin 210, the rotation lever 610 integrally rotates together with the pedal arm 200 about the hinge pin 210, and the lever casings 620 fixed to the pedal housing 100 are always kept fixed in position regardless of the rotation of the pedal arm 200.

When the pedal arm 200 rotates, the connection portion 230 moves along an arc trajectory along a rotation radius based on the hinge pin 210. A first hole 621 is formed in each of the lever casings 620 and includes an arc curvature to allow the connection portion 230 to move along the arc trajectory.

The magnet portions 300 according to an exemplary embodiment of the present disclosure include: a first magnet 310 coupled to one side of the pedal arm 200 and spaced from the hinge pin 210 coupled to the pedal arm 200 at a predetermined distance, the first magnet 310 being configured to move along an arc trajectory based on the hinge pin 210 when the pedal arm 200 rotates; and a second magnet 320 spaced from the hinge pin 210 at a distance longer than the distance between the hinge pin 210 and the first magnet 310, the second magnet 320 being coupled to be rotatable in place at any one position on the lever casing 620.

A seating portion 240 protrudes from a position between the hinge pin 210 and the connection portion 230 at one side of the pedal arm 200, and the first magnet 310 is coupled to the seating portion 240. A protective cover 250 is coupled to the seating portion 240 and protects the first magnet 310.

The seating portion 240 is provided to penetrate the lever casings 620 and is integrally coupled to the rotation lever 610.

When the pedal arm 200 rotates, the seating portion 240, to which the first magnet 310 is coupled, moves along the arc trajectory along the rotation radius based on the hinge pin 210. A second hole 622 is formed in each of the lever casings 620 and includes an arc curvature to allow the seating portion 240 to move along the arc trajectory.

The second magnet 320 provided in the lever casings 620 is coupled to be rotatable at a position spaced from the second hole 622 in a direction opposite to the second hole 622 with the first hole 621 interposed therebetween.

The first magnet 310 is positioned closer to the hinge pin 210, and the second magnet 320 is positioned to be spaced from the hinge pin 210 at a distance longer than the distance between the first magnet 310 and the hinge pin 210.

In addition, both the first and second magnets 310 and 320 are provided to face the sensor portion 400 of the pedal controller 500 while being externally exposed of the detecting module 600, which enables more accurate detecting.

The first magnet 310 is a movable magnet that moves along the arc trajectory when the pedal arm 200 operates. The second magnet 320 is a rotation magnet that rotates in place at any one position on the lever casing 620 when the pedal arm 200 rotates.

That is, a pinion gear 630 is rotatably coupled to the lever casings 620, and a gear portion 611 is formed at an end portion of the rotation lever 610 and engages with the pinion gear 630. The second magnet 320 is coupled to a center portion of the pinion gear 630. When the rotation lever 610 is rotated by the rotation of the pedal arm 200, the second magnet 320 is rotated in place at any one position by the rotation of the pinion gear 630.

The sensor portions 400 according to an exemplary embodiment of the present disclosure include: a Hall switch 410 and a first Hall sensor 420 provided on the pedal controller 500 to face the first magnet 310; and a second Hall sensor 430 provided to face the second magnet 320.

The Hall switch 410, the first Hall sensor 420, and the second Hall sensor 430 detect the rotation of the pedal arm 200 by detecting a change in magnetic flux according to the change in positions of the first and second magnets 310 and 320 when the pedal arm 200 operates.

The pedal controller 500 transmits a signal, which is related to the function of the stop lamp switch, to the vehicle controller 10 by use of a signal of the Hall switch 410. Furthermore, the pedal controller 500 transmits a signal, which is related to the braking function of the vehicle that corresponds to the function of the stroke sensor, to the braking controller 20 by use of a signal of the first Hall sensor 420 and a signal of the second Hall sensor 430.

The first Hall sensor 420 and the Hall switch 410 are disposed on a line L1 extending straight from a center portion of the hinge pin 210.

When the pedal arm 200 rotates, the first magnet 310 moves along the arc trajectory along the rotation radius based on the hinge pin 210. In the instant case, the first Hall sensor 420 and the Hall switch 410 need to be disposed on the line L1 extending straight from the center portion of the hinge pin 210 so that the first Hall sensor 420 and the Hall switch 410 may be configured to generate the signals at the same point in time, and an error may be easily detected.

According to an exemplary embodiment of the present disclosure, two Hall switches 410 may be provided. The two Hall switches 410 may be disposed at two opposite sides of the first Hall sensor 420, one Hall switch for each side, in a state in which the first Hall sensor 420 is provided at a center portion between the two Hall switches 410. The two Hall switches 410 are spaced from the first Hall sensor 420 at a same distance. Therefore, it is possible to more efficiently and accurately obtain a detecting value.

The pedal controller 500 according to an exemplary embodiment of the present disclosure is configured to determine the signal of the first Hall sensor 420, which is relatively higher in accuracy between the signal of the first Hall sensor 420 and the signal of the second Hall sensor 430, as a main signal and transmits the main signal to the main braking controller (the IEB controller 21) that forms the braking controller 20. The pedal controller 500 is configured to determine the signal of the second Hall sensor 430, which is relatively strong against an external magnetic field, as a redundancy signal and transmits the redundancy signal to the auxiliary braking controller (the RCU controller 22) that forms the braking controller 20.

The first magnet 310 is integrated with the pedal arm 200 and moves along the arc trajectory when the pedal arm 200 rotates. Therefore, the first Hall sensor 420 detects a displacement of the first magnet 310 having a large movement displacement so that the precision of a detecting output is high. Therefore, the pedal controller 500 is configured to determine the signal of the first Hall sensor 420, which is relatively high in precision, as the main signal and transmits the main signal to the IEB controller 21. In the instant case, the IEB controller 21 is the main braking controller.

Because the second magnet 320 rotates in place when the pedal arm 200 rotates, the second magnet 320 has a smaller movement displacement than the first magnet 310. Therefore, the second Hall sensor 430 has the sensing output with relatively low precision, but the second magnet 320, which rotates in place, is strong against the external magnetic field (an influence of the external magnetic field is minimized). Therefore, the pedal controller 500 is configured to determine the signal of the second Hall sensor 430, which is relatively strong against the external magnetic field, as the redundancy signal and transmits the redundancy signal to the RCU controller 22. In the instant case, the RCU controller 22 is the auxiliary braking controller.

Figure 10:
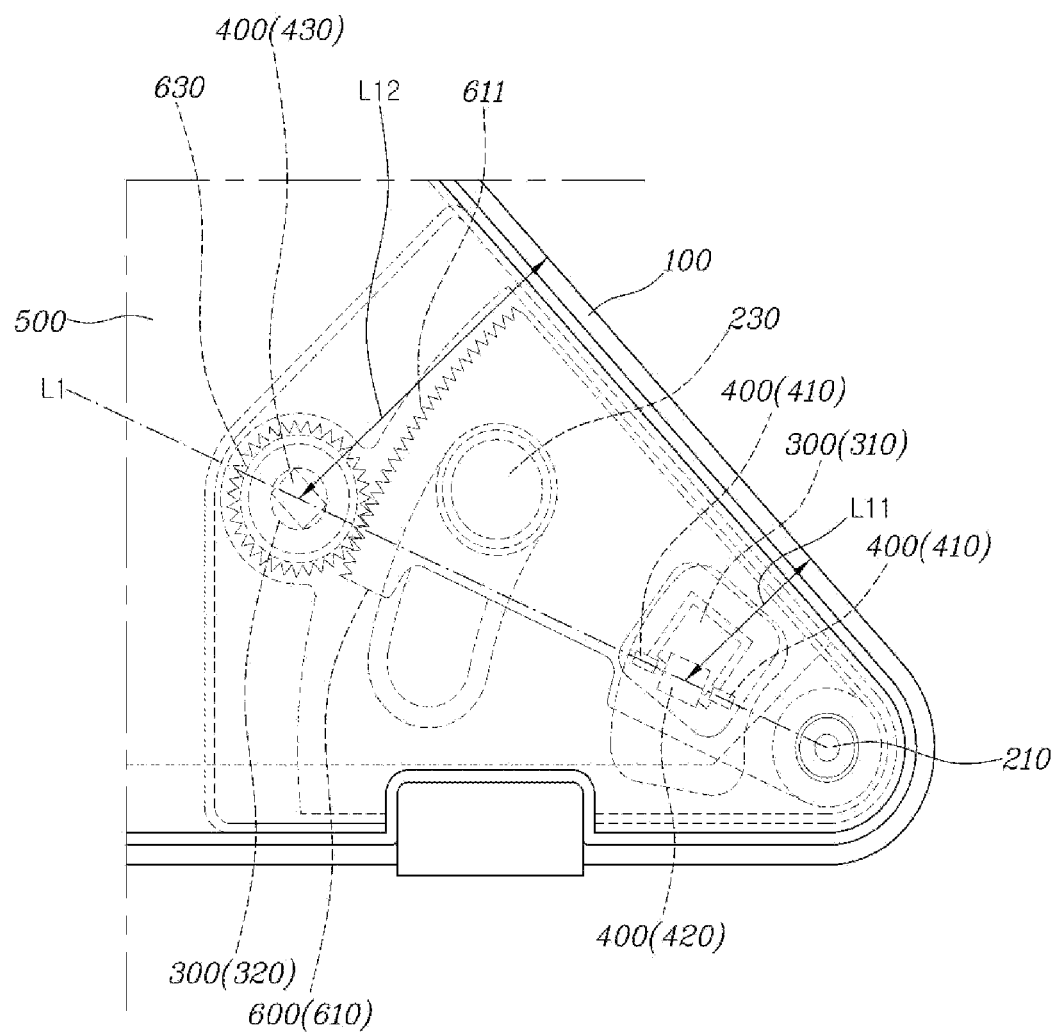
Figure 11:
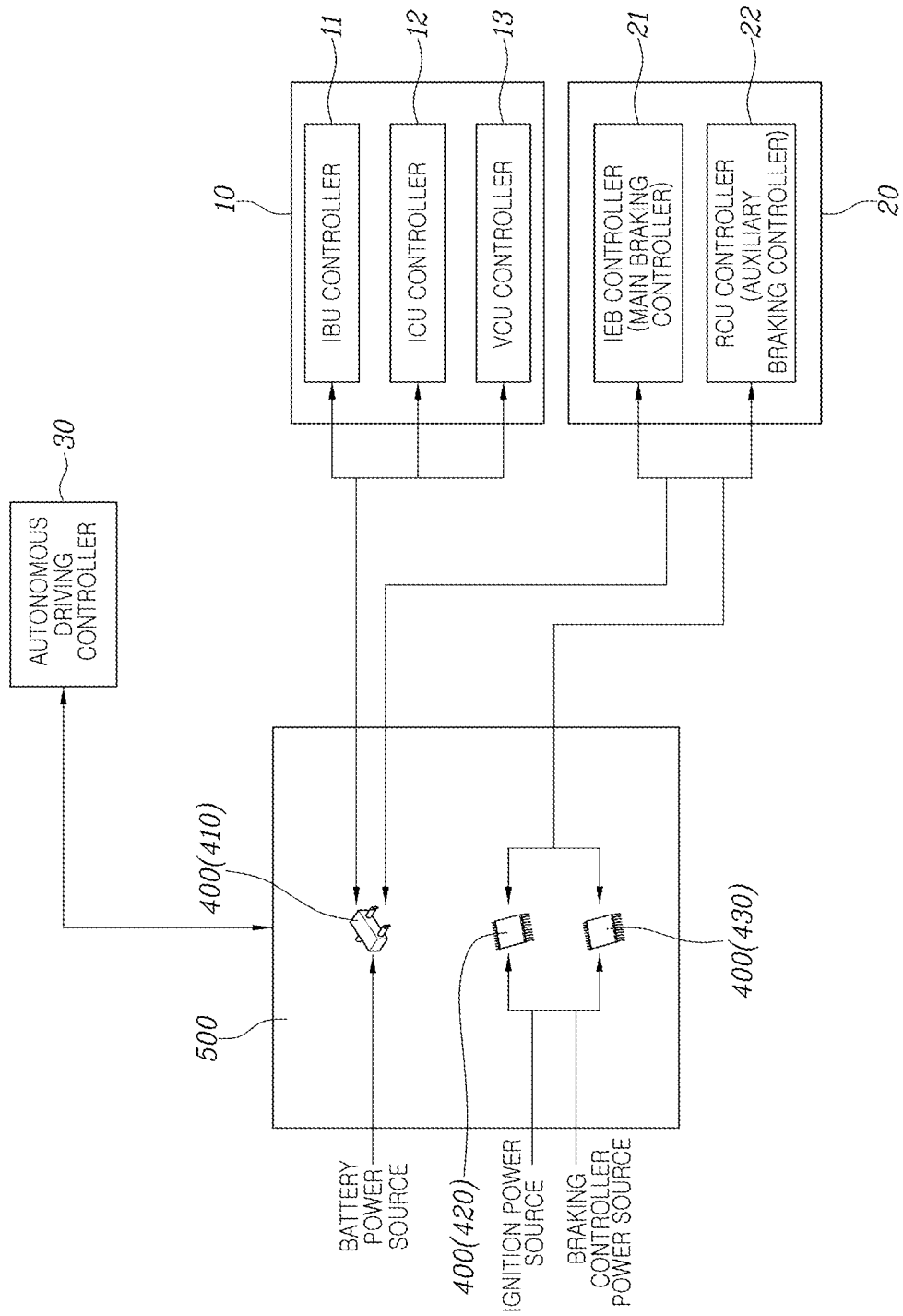
FIG. 11 is a view for schematically explaining signal processing of the electronic brake pedal apparatus according to an exemplary embodiment of the present disclosure.

As illustrated in FIG. 10, the second Hall sensor 430 is positioned to be spaced from the surface of the pedal housing 100 at a distance longer than a distance between the first Hall sensor 420 and the surface of the pedal housing 100.

The Hall switch 410, the first Hall sensor 420, and the second Hall sensor 430 may be disposed on the line L1 extending straight from the center portion of the hinge pin 210. The first Hall sensor 420 is positioned at a position closer to the hinge pin 210, and the second Hall sensor 430 is positioned at a position farther from the hinge pin 210 than the first Hall sensor 420 from the hinge pin 210.

Therefore, the second Hall sensor 430 is positioned to be spaced from the surface of the pedal housing 100 at the distance longer than the distance between the first Hall sensor 420 and the surface of the pedal housing 100 (L11<L12).

Because a distance L11 between the first Hall sensor 420 and the surface of the pedal housing 100 is relatively short, the signal of the first Hall sensor 420 is disadvantageous because the signal of the first Hall sensor 420 is greatly affected by the external magnetic field. However, because the first Hall sensor 420 includes the sensing output with high precision, the signal of the first Hall sensor 420 is suitable to be used as the main signal.

Because a distance L12 between the second Hall sensor 430 and the surface of the pedal housing 100 is relatively long, the second Hall sensor 430 is strong against the external magnetic field so that the signal of the second Hall sensor 430 is suitable to be used as the redundancy signal, which makes it possible to detect abnormality of the signal of the first Hall sensor 420.

According to an exemplary embodiment of the present disclosure, the Hall switch 410 is connected to a battery power source (B+) of the vehicle and transmits the signal to the vehicle controller 10 and the braking controller 20. The first Hall sensor 420 and the second Hall sensor 430 are connected to an ignition power source of the vehicle or connected to a power source of the braking controller 20 and transmit the signals to the braking controller 20.

Even though the driver operates the brake pedal in the state in which the vehicle is turned off, the braking signal needs to be generated, the stop lamp of the vehicle needs to be turned on, and the braking of the vehicle needs to be possible to ensure safety. To the present end, in the exemplary embodiment of the present disclosure, the Hall switch 410 is connected to the battery power source (B+) of the vehicle, and the first Hall sensor 420 and the second Hall sensor 430 are connected to the ignition power source of the vehicle or the power source of the braking controller 20, i.e., connected to a power source of the IEB controller 21 and a power source of the RCU controller 22. Therefore, it is possible to minimize dark current.

Furthermore, in the exemplary embodiment of the present disclosure, in the state in which the vehicle is turned off, only the Hall switch 410 is kept in an activated state, and the pedal controller 500 and the braking controller 20 are kept in a deactivated state. Therefore, it is possible to minimize dark current.

When the pedal arm 200 is rotated by operation of the driver in the state in which the vehicle is turned off, the signal of the Hall switch 410 is transmitted to the ICU controller 12, which forms the vehicle controller 10 so that the stop lamp is turned on, and the braking controller 20 and the pedal controller 500 are activated by the signal of the Hall switch 410. Therefore, power is supplied to the first Hall sensor 420 and the second Hall sensor 430, the first Hall sensor 420 and the second Hall sensor 430 detect the rotation of the pedal arm 200 based on the change in magnetic flux, the pedal controller 500 transmits the signal, which is proportional to the rotation of the pedal arm 200, to the braking controller 20, and the braking controller 20 generates the signal related to the braking function of the vehicle.

Meanwhile, when the pedal arm 200 does not rotate for a predetermined time period in the state in which the braking controller 20 and the pedal controller 500 are activated, the braking controller 20 and the pedal controller 500 enter a deactivation mode, minimizing dark current.

Furthermore, when the vehicle is turned on, the braking controller 20 and the pedal controller 500 are activated regardless of the Hall switch 410.

The Hall sensors 420 and 430 output the change in magnetic flux according to the pedal operation amount as continuous signals. The Hall switch 410 generates an on or off signal based on whether the pedal operation amount is equal to or greater than a reference value. When the pedal operation amount is equal to or greater than the reference value, the off-state is changed to the on-state.

The electronic brake pedal apparatus according to an exemplary embodiment of the present disclosure further includes a foldable mechanism 700 provided in the pedal housing 100, connected to the pedal arm 200, and configured to enable a pop-up operation and a hiding operation of the pedal arm.

The foldable mechanism 700 may include an actuator (motor) 710 fixed on the pedal housing 100, and a gear member 720 configured to connect the actuator 710 and the pedal arm 200.

The pedal arm 200 may switch, by operation of the foldable mechanism 700, between a pop-up state in which the pedal arm 200 protrudes from the pedal housing 100, as illustrated in FIG. 1, so that the driver may operate the pedal arm 200 and a hidden state in which the pedal arm 200 is hidden by being inserted into the pedal housing 100 so that the driver cannot operate the pedal arm 200.

The pedal controller 500 according to an exemplary embodiment of the present disclosure includes a function of controlling an operation of the foldable mechanism 700, and a function of processing a signal with an autonomous driving controller 30.

The autonomous driving controller 30 may transmit a pop-up signal for an accelerator pedal and the brake pedal, and the autonomous driving controller 30 may receive a foldable pedal state and determine whether to switch to a manual operation mode after the pop-up.

If the pedal is not completely popped up after the pop-up, the autonomous driving controller 30 may perform control to transmit a failure signal and maintain an autonomous driving mode.

Furthermore, the autonomous driving controller 30 may transmit a signal for an operation of hiding the pedal when the mode is changed to the autonomous driving mode in the state in which the accelerator pedal and the brake pedal are popped upwards.

The electronic brake pedal apparatus according to various exemplary embodiments of the present disclosure may include the first magnet 310 coupled to the pedal arm 200 and configured to move along the arc trajectory when the pedal arm 200 rotates; the second magnet 320 provided on the detecting module 600 connected to the pedal arm 200 and configured to rotate in place at any one position on the detecting module 600 when the pedal arm 200 rotates; and the pedal controller 500 including the first Hall sensor 420 and the Hall switch 410 facing the first magnet 310, and the second Hall sensor 430 facing the second magnet 320, the pedal controller 500 being fixed to the pedal housing 100. The pedal controller 500 transmits the signal to the vehicle controller 20 by use of the signal of the Hall switch 410 and transmits signal to the braking controller 20 by use of the signal of the first Hall sensor 420 and the signal of the second Hall sensor 430. The vehicle controller 20 is configured to control the signal related to the function of the stop lamp switch. The braking controller 20 is configured to control the signal related to the braking function of the vehicle that corresponds to the function of the stroke sensor.

As described above, the electronic brake pedal apparatus according to an exemplary embodiment of the present disclosure is configured to perform the function of the stop lamp switch and the function of the stroke sensor in the related art by use of the electronic Hall sensors 420 and 430 and the Hall switch 410. Therefore, it is possible to simplify the configuration, reduce the weight and costs, decrease the external size, and improve the durability by use of the contactless configuration.

Furthermore, the electronic brake pedal apparatus according to an exemplary embodiment of the present disclosure may diagnose the failure by use of the two Hall sensors 420 and 430 and the Hall switch 410. Therefore, it is possible to improve the reliability and marketability of the electronic brake pedal apparatus.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic brake pedal apparatus comprising:
   a pedal arm rotatably coupled to a pedal housing;
   a plurality of magnet portions connected to the pedal arm and configured to change magnetic flux when the pedal arm rotates;
   a plurality of sensor portions configured to detect a change in the magnetic flux of the magnet portions;
   a pedal controller fixed to the pedal housing to face the magnet portions and connected to the plurality of sensor portions, the pedal controller being configured to transmit a control signal to a vehicle controller and a braking controller by use of signals of the sensor portions; and
   a detecting module disposed between the pedal arm and the pedal controller so that the magnet portions are positioned on the detecting module,
   wherein the detecting module includes:
      a rotation lever connected to one side of the pedal arm and configured to rotate together with the pedal arm; and
      a lever casing fixed to the pedal housing and configured to cover the rotation lever, and
   wherein the magnet portions include:
      a first magnet coupled to one side of the pedal arm and spaced from a hinge pin coupled to the pedal arm at a predetermined distance, the first magnet being configured to move along an arc trajectory based on the hinge pin when the pedal arm rotates; and
      a second magnet spaced from the hinge pin at a distance longer than a distance between the hinge pin and the first magnet, the second magnet being coupled to be rotatable in place at a position on the lever casing.

2. The electronic brake pedal apparatus of claim 1, wherein the vehicle controller is configured to control a signal related to a function of a stop lamp switch and includes at least one of a controller of turning on a vehicle, a controller of controlling an operation of turning on or off a stop lamp, and a controller of controlling a shift lock.

3. The electronic brake pedal apparatus of claim 1,
   wherein the braking controller is configured to control a signal related to a braking function of a vehicle that corresponds to a function of a stroke sensor, and
   wherein the braking controller includes:
      a main braking controller configured to control braking of the vehicle; and
      an auxiliary braking controller configured to perform a redundancy function of the main braking controller.

4. The electronic brake pedal apparatus of claim 1, wherein the first magnet and the second magnet are provided to face the sensor portions of the pedal controller while being externally exposed of the detecting module.

5. The electronic brake pedal apparatus of claim 1, wherein a pinion gear is rotatably coupled to the lever casing, a gear portion is formed at an end portion of the rotation lever and engages with the pinion gear, the second magnet is coupled to a center portion of the pinion gear, and the second magnet is rotated in place by a rotation of the pinion gear when the rotation lever rotates.

6. The electronic brake pedal apparatus of claim 1,
   wherein the sensor portions include a Hall switch provided on the pedal controller to face the first magnet, and
   wherein the pedal controller is configured to transmit a signal, which is related to a function of a stop lamp switch, to the vehicle controller by use of a signal of the Hall switch.

7. The electronic brake pedal apparatus of claim 6, wherein the sensor portions further include a first Hall sensor and a second Hall sensor provided on the pedal controller to face the first magnet and the second magnet, and wherein the pedal controller is configured to transmit a signal, which is related to a braking function of a vehicle that corresponds to a function of a stroke sensor, to a braking controller by use of a signal of the first Hall sensor and a signal of the second Hall sensor.

8. The electronic brake pedal apparatus of claim 7, wherein the first Hall sensor and the Hall switch are disposed on a line extending straight from a center portion of the hinge pin.

9. The electronic brake pedal apparatus of claim 8, wherein the Hall switch is provided as two Hall switches, the two Hall switches are disposed at first and second opposite sides of the first Hall sensor, one Hall switch for each opposite side, in a state in which the first Hall sensor is provided at a center portion between the two Hall switches, and the two Hall switches are spaced from the first Hall sensor at a same distance.

10. The electronic brake pedal apparatus of claim 7, Wherein the pedal controller is configured to determine the signal of the first Hall sensor, which is relatively higher in accuracy between the signal of the first Hall sensor and the signal of the second Hall sensor, as a main signal and to transmit the main signal to a main braking controller that forms the braking controller, and wherein the pedal controller is further configured to determine the signal of the second Hall sensor as a redundancy signal and to transmit the redundancy signal to an auxiliary braking controller that forms the braking controller.

11. The electronic brake pedal apparatus of claim 7, wherein the second Hall sensor is positioned to be spaced from a surface of the pedal housing at a distance longer than a distance between the first Hall sensor and the surface of the pedal housing.

12. The electronic brake pedal apparatus of claim 7, wherein the Hall switch is connected to a battery power source of the vehicle and to transmit a signal to the vehicle controller and the braking controller, and the first Hall sensor and the second Hall sensor are connected to an ignition power source of the vehicle or connected to a power source of the braking controller and transmit signals to the braking controller.

13. The electronic brake pedal apparatus of claim 12, wherein in a state in which the vehicle is turned off, only the Hall switch is kept in an activated state, and the pedal controller and the braking controller are kept in a deactivated state.

14. The electronic brake pedal apparatus of claim 13, wherein when the pedal arm is rotated in response to operation of a driver in a state in which the vehicle is turned off, a signal of the Hall switch is transmitted to the vehicle controller, a stop lamp is turned on, the braking controller and the pedal controller are activated by the signal of the Hall switch, power is supplied to the first Hall sensor and the second Hall sensor, the first Hall sensor and the second Hall sensor detect a rotation of the pedal arm based on the change in the magnetic flux, the pedal controller is configured to transmit a signal, which is proportional to the rotation of the pedal arm, to the braking controller, and the braking controller is configured to generate a signal related to the braking function of the vehicle.

15. The electronic brake pedal apparatus of claim 14, wherein the braking controller and the pedal controller enter a deactivation mode when the pedal arm does not rotate for a predetermined time period in a state in which the braking controller and the pedal controller are activated.

16. The electronic brake pedal apparatus of claim 1,
wherein a connection portion is provided at one side of the pedal arm and connects the pedal arm and the rotation lever, wherein a seating portion, to which the first magnet is coupled, is provided at one side of the pedal arm, wherein the connection portion and the seating portion move along arc trajectories along a rotation radius based on the hinge pin when the pedal arm rotates, wherein first and second holes each including an arc curvature are formed in the lever casing to allow the connection portion and the seating portion to move, and wherein the second magnet is positioned to be spaced from the second hole in a direction opposite to the second hole with the first hole interposed therebetween.

17. The electronic brake pedal apparatus of claim 1, further including:
a foldable mechanism provided in the pedal housing, connected to the pedal arm, and configured to enable a pop-up operation and a hiding operation of the pedal arm, wherein the pedal controller is configured to control an operation of the foldable mechanism and to process a signal with an autonomous driving controller.

18. An electronic brake pedal apparatus comprising:
a first magnet coupled to a pedal arm and configured to move along an arc trajectory when the pedal arm rotates;

a second magnet provided on a detecting module connected to the pedal arm and configured to rotate in place at a position on the detecting module when the pedal arm rotates; and a pedal controller including a first Hall sensor and a Hall switch facing the first magnet and a second Hall sensor facing the second magnet, the pedal controller being fixed to a pedal housing, wherein the pedal controller is configured to transmit a signal to a vehicle controller by use of a signal of the Hall switch and to transmit a signal to a braking controller by use of a signal of the first Hall sensor and a signal of the second Hall sensor, wherein the vehicle controller is configured to control a signal related to a function of a stop lamp switch, and wherein the braking controller is configured to control a signal related to a braking function of a vehicle that corresponds to a function of a stroke sensor.

* * * * *